Nov. 16, 1937.  H. E. TAUTZ  2,099,321
SCROLL SAW
Filed May 22, 1935  3 Sheets-Sheet 3
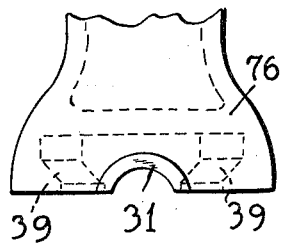
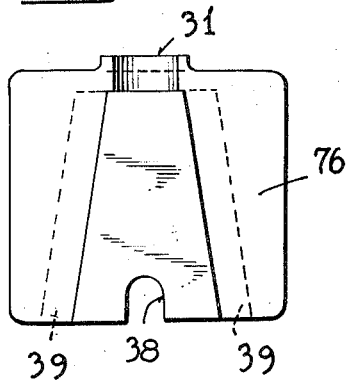
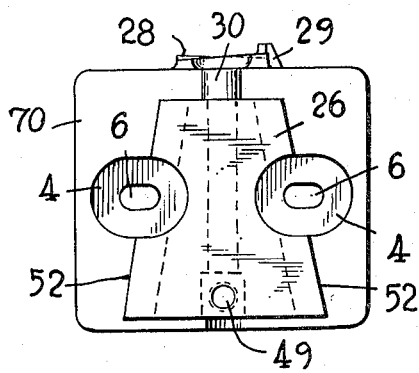
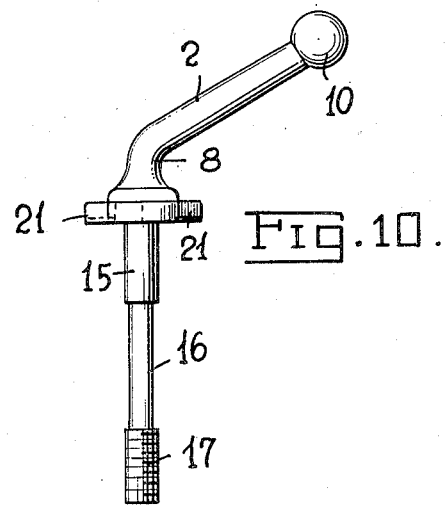
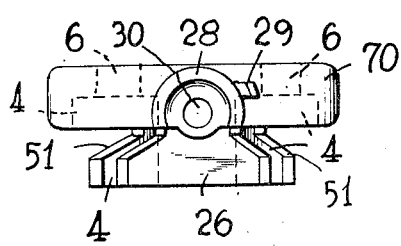
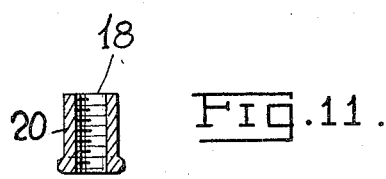
Inventor
Herbert E. Tautz,
By Carl A. Hellmann,
Attorney Patented Nov. 16, 1937

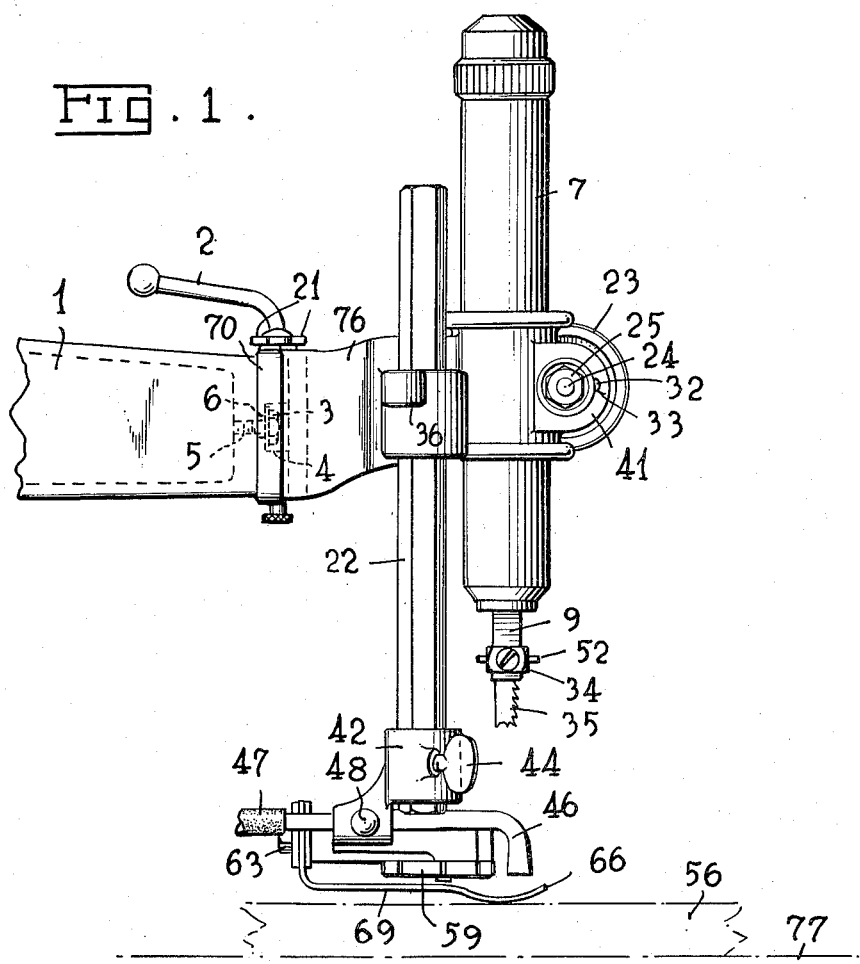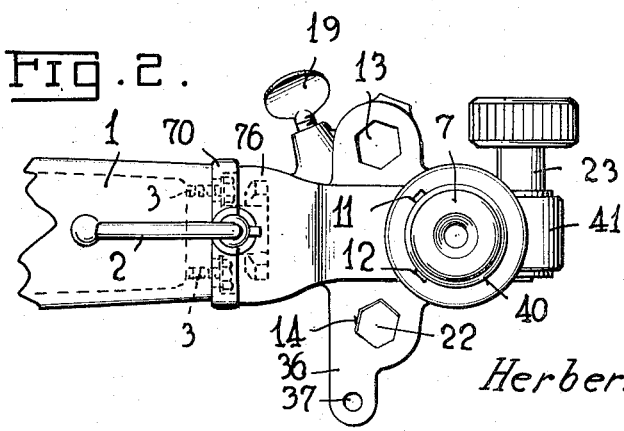

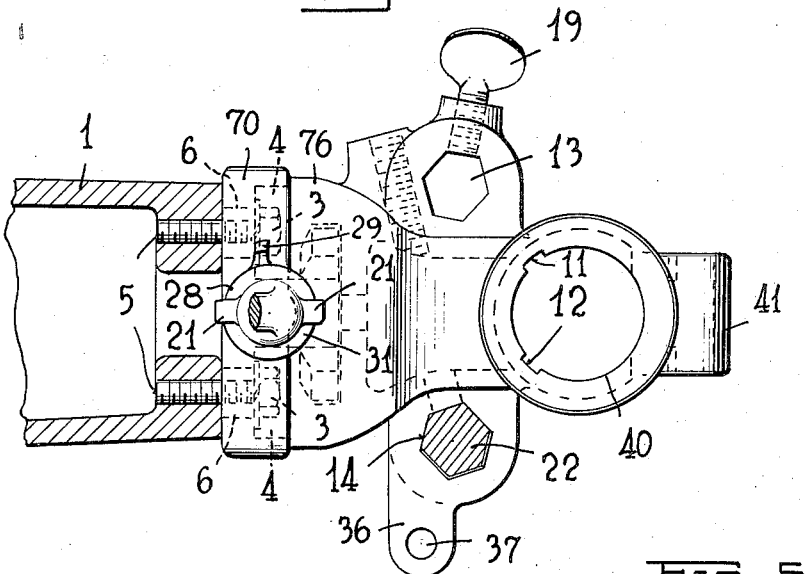
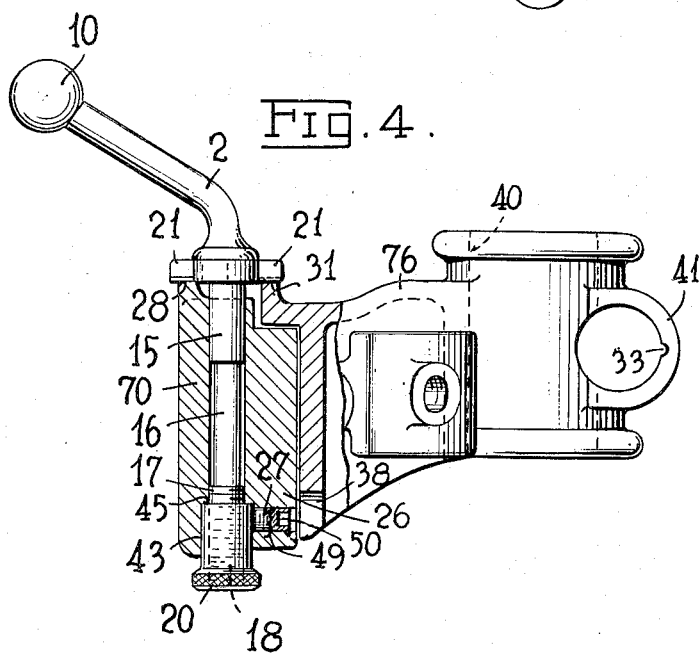
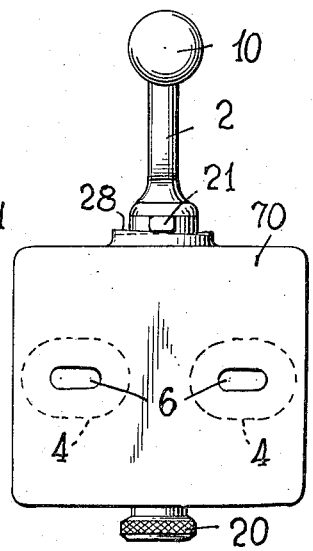

2,099,321

UNITED STATES PATENT OFFICE 2,099,321

SCROLL SAW

Herbert E. Tautz, Milwaukee, Wis., assignor to Delta Manufacturing Company, Milwaukee, Wis.

Application May 22, 1935, Serial No. 22,824

3 Claims. (Cl. 143—70)

This invention relates to scroll saws.

More specifically it relates to improvements in the structure of the head of a scroll saw, particularly one of the type shown, for example, in my prior Patents Nos. 1,877,705, 1,964,651, and 1,964,652, and in my co-pending application Serial No. 22,823, filed May 22, 1935, now Patent No. 2,073,430, dated March 9, 1937.

The object of the present device is to provide an improved head for supporting the saw guide, presser foot, etc., of the type disclosed in Figs. 13, 14, and 15, of said above identified Patent No. 2,073,430, but not claimed therein, wherein the head is held to the end of the frame by means of tapered dovetails, the present case dealing also with means for locking or otherwise securing the two dovetail members to one another in definite correctly alined positions, while at the same time providing for ready disengagement of said members from one another.

Stated specifically, the chief object of the present invention is to provide a support of this kind which will automatically resume a definite position with respect to the saw blade and the workpiece after one of the dovetail members has been removed and returned, thus making it possible to remove, adjust and replace such member without disturbing the set-up of the workpiece on the table of the saw. This feature is extremely desirable in cases where much pierced work is done on the scroll saw, that is, work involving cuts which do not run to the edge of the workpiece, but must be started by means of holes pierced in the workpiece into which the saw blade must be inserted by disengaging it from at least one of its chucks or other supports.

In the companion case (Patent 2,073,430) the dovetail members engage one another due solely to gravitation and to the downward pull of the saw blade and this is sufficient in many instances. It may be desirable in certain cases, however, to provide a definite locking and clamping device which permits no vertical yield and such features are provided in the present case, wherein definite assurance is provided that after removal of the outer dovetail member it will assume exactly the same relationship with respect to the remainder of the machine upon again clamping it by means of a simple clamping device forming part of the present invention.

Further objects and advantages of the invention will be obvious from the various features disclosed in the present specification and drawings and defined in the appended claims.

For a clear understanding of this invention reference should be made to the accompanying drawings illustrating a preferred embodiment thereof.

In said drawings:

Fig. 1 is a side elevation of a portion of a scroll saw embodying the invention, namely, the portion ordinarily known as the head, Fig. 2 is a top view of the structure shown in Fig. 1, Figs. 3–11 are on an enlarged scale.

Fig. 3 is a top view of the detachable head, the cooperating end of the frame being shown partly broken away and in section, Fig. 4 is a side elevation, partly in vertical section, of the detachable head, and of an attaching plate for the same, Fig. 5 is a rear elevation of the plate to which the removable head is secured, Fig. 6 is a fragmentary plan view of the rearward end portion of the removable head, Fig. 7 is a rear elevation of said head, Fig. 8 is a front elevation of the attaching plate shown in Fig. 5, Fig. 9 is a plan view thereof, Fig. 10 is an elevation of the lock operating means, and Fig. 11 is an axial sectional view of a threaded bushing cooperating with said lock operating means.

In the various figures similar parts are designated by the same reference characters.

Referring now particularly to Figs. 1, 2, and 3, reference character I designates a partly broken away end portion of the upper arm of a scroll saw frame and 70 is a supporting member which may be secured to the end of the frame I in any desired manner, for example, by means of cap screws 3 threaded into bores 5 in the frame I and bearing against a portion of the member 70, which may be slotted and counterbored as at 6 and 4 (Fig. 8) to accommodate such cap screws, the slots 6 being made of sufficient size to permit a certain degree of adjustment so that the element 70 may be moved into the proper position to provide correct alinement of the saw blade and its operating mechanism. Reference to Fig. 3 shows that two such cap screws 3 are provided and also shows how the member 70 may be adjusted laterally while Fig. 1 shows the possibility of slight vertical adjustment due to the play between the shanks of the screws 3 and the horizontal edges of the slots 6.

The portion 76 which supports the saw blade, presser foot, etc., is made detachable from the portion 70 by means of a dovetail engagement between said two parts in the manner illustrated in Figs. 13 to 15 of the U. S. Patent No. 2,073,430 hereinabove referred to. It will be noted that the member 76 is provided with a bore 40 best shown in Figs. 2 and 3, to receive the housing 7, which carries the reciprocating plunger 9, the structure of these parts being disclosed in the prior patents hereinabove referred to and forming no part of the present invention. The housing is preferably provided with a key-like projection or feather which may engage in either of the slots 11 or 12 in the member 76, said slots being so positioned that shifting the said feather from one to the other will turn the housing 7 through an angle of 90° about its longitudinal axis.

The member 76, which is preferably made hollow to decrease its weight and cost, is also provided with two preferably hexagonal bores 13 and 14, arranged on opposite sides of the member, as shown in Fig. 3.

The structure and arrangement of said bores are clearly described in the said U. S. Patent No. 2,073,430 and are claimed therein and form no part of the present invention. For further details as to such arrangement and purpose, reference is therefore, to be had to said patent.

It will suffice to state here that the rod 22 which supports the presser foot 42 is arranged to be slidably engaged in either bore 13 or bore 14 and to be clamped therein by a thumb screw 19 which may be shifted as necessary to accomplish such clamping.

The plunger 9 which is guided in the head 7 carries the upper chuck 34 for holding the upper end of a saw blade 35 or the like. 23 is a clamping screw having a threaded shank 24 cooperating with a nut 25 and with wedges seated within the projecting portion 41 of the member 76 to clamp the tube 7 firmly in any adjusted position, the wedges being prevented from turning by means of lugs 32 fitting slidably in a recess 33 in member 76, all as described in said U. S. Patent No. 2,073,430. A lug 36 having a bore 37 therein may also be provided as a part of member 76 to serve for holding a lamp or other auxiliary device.

The presser foot 42, which is secured to the rod 22 by means of the thumb screw 44, carries a slotted saw guide 59 and a spring hold-down 69 clamped to part 42 by means of a cap screw 63 and having its end 66 bearing against the workpiece 56 resting upon the saw table 77. 46 is a sawdust blower nozzle to which air is supplied through the tube 47 and which is clamped to the part 42 by means of the screw 48. All these details are embodied in my prior cases aforesaid and are mentioned here merely to facilitate an understanding of the present invention.

While in the U. S. Patent No. 2,073,430 aforesaid there has been illustrated a two part head held together by dovetails so as to be readily taken apart and again replaced, the present case differs from said U. S. Patent No. 2,073,430 in providing a definite holding means for securing the two dovetail members to one another.

This mechanism is operated by the lever 2 provided with an ornamental knob 10 and preferably bent at 8, as shown most clearly in Fig. 10. The operating lever 2 has a downwardly extending shaft consisting of an upper portion 15 of full diameter, a central portion 16 of reduced diameter and a lower portion 17 again of larger diameter and threaded as illustrated. The threads 17 will fit properly into the corresponding threads 18 of the bushing 20 shown in Fig. 11.

Reference to Fig. 4 shows this relationship clearly. It will be noted from this figure that the bushing 20 is fitted into a bore 43 in the plate 70 and abuts against a shoulder 45 at the upper end of said bore 43. A set screw 27 threaded into a bore 49 in the plate 70 bears against the outer surface of the bushing 20 and is intended to secure said bushing firmly in any desired position. The set screw 27 is preferably of the so-called headless type having a polygonal socket 50 therein to cooperate with an operating wrench of corresponding polygonal shape fitting thereinto. Near the upper end of the portion 15 of the operating member 2 there is provided a cam or latch having two projections 21, 21 as shown clearly in the various figures and for a purpose which will be explained fully hereinafter.

The plate 70 is provided with a male dovetail member as shown best in Figs. 8 and 9, at 26. This dovetail member has undercut tapered portions at 51, Fig. 9, and also has the outer edges of the portion 26 tapered upwardly as shown best in Fig. 8, at 52. The rear end of the member 76 is provided with a correspondingly shaped female dovetail, as best shown in Figs. 6 and 7. The sloping portions 39 of said female dovetail are likewise tapered in two directions so as to correspond to the shape of the male dovetail of Figs. 8 and 9 to interlock therewith and receive the same snugly.

The member 76 is preferably provided with a notch 38, shown best in Figs. 4 and 7, to permit access to the end of the set screw 27 when the dovetail members are in engagement with one another. The plate 70 is provided with an arcuate, somewhat more than semi-circular, cam surface 28 at its upper end, as clearly shown in Figs. 8 and 9. The member 76 has a corresponding arcuate cam surface shown at 31, the surfaces 31 and 28 forming approximately a complete ring when the two parts 70 and 76 are in engagement with one another, as indicated in Fig. 3.

These cam surfaces have their lowest points so arranged that the lugs 21, 21 will engage said lowest parts when the operating member 2 is turned counter-clockwise to a position in which the said lugs 21, 21 will just still engage their respective seats 28 and 31. Due to this slope of the upper surface of each of these cam members, it is clear that turning the operating lever 2 in a clockwise direction, as viewed from above, will force the member 76 down with respect to the member 70, thus causing the interlocking dovetail elements to engage one another firmly.

The stop 29 will prevent accidental disengagement of the lugs 21 due to over-actuation of the operating member 2. Moreover, when the latch 21, 21 is turned as far as possible counter-clockwise, the part 76 will clear the latch. The stop thus has two functions, first, preventing over-rotation of the latch in a clockwise direction and, second, serving as a proper stop for the latch in the opposite direction, also, to keep it clear of the member 76.

The vertical height of such latch lugs 21, 21 may be adjusted by suitably turning the bushing 20 in its bore 43 whereby the cooperating threads 17 and 18 will bring the member 2 to any desired elevation. When the proper adjustment has been secured the bushing 20 may be clamped in such adjusted position by means of the set screw 27. It is clear that in addition to the camming action provided by the inclined faces of cams 28 and 31 there will be an additional clamping action provided by the downward movement of the operating member 2 due to the pitch of the screw threads 17.

It is, therefore, clear that while two cooperating means have been disclosed for forcing the member 76 downward with respect to the member 70, it is not necessary in all cases that both such means be present as either the cam surfaces alone or the screw threads alone will suffice to perform this function. The invention is, therefore, not to be limited to these two modes of clamping in combination, except as required by the claims.

The operation of the present scroll saw will be clear from the above description of its structure. It may be described briefly as follows, as far as the features of the present invention are concerned.

Assuming that the scroll saw is being used with a saw blade 35 clamped in the upper chuck 34 and actuated by the mechanism beneath the table 77 in the customary manner, if for any reason it becomes necessary to remove the head 76, together with the parts carried hereby and designated in general by reference characters 7, 22 and 42, it is necessary merely to release the thumb screw 52 of the upper chuck 34, which in turn will release the blade 35 from said chuck, and then to turn the operating device 2 in a counter-clockwise direction to a sufficient extent to disengage the head 76 from the member 70.

It then becomes possible to lift off the head 76 bodily, together with all the parts carried thereby whereupon the workpiece 56 may be lifted off from the table 77 and off from the blade 35 for any desired manipulation on any other machine, or for replacing on the table 77 in some different position, for example, with the saw blade 35 engaged in another hole in the workpiece, for sawing out a different section of said workpiece.

After the workpiece 56 has thus been replaced in its new position, in order to reestablish the operation of the scroll saw it is necessary merely to replace the member 76 upon the member 70 by means of the cooperating dovetail members and thereupon to secure said two parts to one another in their former alinement by again tightening the operating means 2. Thereupon the saw blade 35 may be again clamped in the upper chuck 34 by means of the thumb screw 52 and it will once more assume its former position with respect to the table 77 and the workpiece 56 resting thereon, so that work may be resumed without losing much time.

Heretofore such manipulation of the workpiece has required removal of the saw blade and raising of the presser foot whereupon it was necessary to readjust both the saw blade and the presser foot after the workpiece 56 had been replaced in its new position and this consumed considerable time and often also occasioned loss of accuracy in the setting of the saw blade or presser foot so that the work performed after the shifting of the workpiece differed in character and alinement from the preceding work in the same workpiece.

If the piece being machined in the scroll saw had a large number of closed cutout portions, that is, portions having no communication with other portions or with an edge of the workpiece, it was, of course, necessary to shift the workpiece and saw blade a great number of times, each time running the risk of loss of proper alinement of saw blade and work and also wasting much time.

It is obvious that by means of the present invention these drawbacks have been eliminated and it is possible to do work of this nature much more expeditiously and with far greater approach to accuracy than in the prior forms.

By providing a definite locking means to hold the two dovetail members to one another two advantages are secured, namely, first, the alinement of the parts will always be definitely the same, and, second, due to the latching action of the cam the portion 76 will not accidentally become loosened by vibration and jump off from the plate 70, thus injuring the work and possibly even damaging the machine.

In my Patent No. 2,073,430, the two interengaging members are held together merely by gravitation and by the tension of the saw blade, and no latching device is provided and this, therefore, is the distinguishing feature between the present disclosure and that in said companion case.

It will be understood that the taper of the dovetails is preferably made sufficiently steep to prevent said portions from accidentally binding or becoming "frozen" to one another, thus greatly facilitating and expediting the actuation of said members.

Having disclosed a preferred embodiment of the present invention it will, of course, be understood that certain features thereof may be used without concurrent use of other features of the same and that modifications, additions and omissions of various kinds may be made without departing from the spirit of the invention, and that, therefore, the invention is not to be considered limited to the definite device disclosed herein. For a clear understanding of the invention reference is to be had to the following claims:

I claim:

1. In a mechanism having a frame and a guiding head for a mechanically driven device, means for releasably securing the head to the frame, comprising cooperating dovetail members carried by the frame and by the head respectively and means for latching said dovetail members to one another, said latching means comprising a rotatable and vertically adjustable cam and a stop preventing excess rotation of the cam, so that when the cam is in proper position to release the dovetail members from one another, the stop will automatically prevent further rotation in the releasing direction, said cam having an actuating handle at its upper end, a member projecting downwardly from the cam and means cooperating with said downwardly projecting member for adjusting the position of the cam in a vertical direction.

2. Means for latching a guiding head for a mechanically driven device to a machine frame with which it interlocks, said latching means comprising a rotatable, vertically adjustable latching cam and a stop preventing excess rotation of the cam, so that when the cam is in proper position to release the said head and frame from one another, the stop will automatically prevent further rotation in the releasing direction, said cam having an actuating handle at its upper end, a member projecting downwardly from the cam, and means cooperating with said downwardly projecting member for adjusting the position of the cam in a vertical direction.

3. Means for latching a guiding head for a mechanically driven device to a machine frame with which it interlocks, said latching means comprising a rotatable, vertically adjustable latching cam and a stop preventing excess rotation of the cam, so that when the cam is in proper position to release the said head and frame from one another, the stop will automatically prevent further rotation in the releasing direction, said cam having an actuating handle at its upper end, a member projecting downwardly from the cam, means cooperating with said downwardly projecting member for adjusting the position of the cam in a vertical direction, and means for securing said adjusting means in its adjusted position.

HERBERT E. TAUTZ.